(12) United States Patent
Takaoka et al.

(10) Patent No.: US 9,412,517 B2
(45) Date of Patent: Aug. 9, 2016

(54) ELECTRONIC PART

(71) Applicant: MURATA MANUFACTURING CO., LTD.

(72) Inventors: Hidekiyo Takaoka, Nagaokakyo (JP); Kosuke Nakano, Nagaokakyo (JP); Yutaka Ota, Nagaokakyo (JP); Kenichi Kawasaki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 88 days.

(21) Appl. No.: 14/450,347

(22) Filed: Aug. 4, 2014

(65) Prior Publication Data

US 2014/0340816 A1 Nov. 20, 2014

Related U.S. Application Data

(63) Continuation of application No. PCT/JP2013/053237, filed on Feb. 12, 2013.

(30) Foreign Application Priority Data

Mar. 5, 2012 (JP) .................................. 2012-048026

(51) Int. Cl.
| | |
|---|---|
| *H01G 4/30* | (2006.01) |
| *H01G 4/12* | (2006.01) |
| *H01G 4/232* | (2006.01) |
| *H01G 2/04* | (2006.01) |
| *H01G 4/008* | (2006.01) |
| *H01G 4/252* | (2006.01) |

(52) U.S. Cl.
CPC . *H01G 4/12* (2013.01); *H01G 2/04* (2013.01); *H01G 4/008* (2013.01); *H01G 4/2325* (2013.01); *H01G 4/30* (2013.01); *H01G 4/252* (2013.01)

(58) Field of Classification Search
CPC ......... H01G 4/30; H01G 4/005; H01G 4/008; H01G 4/228; H01G 4/232; H01G 4/2325; H01G 4/248
See application file for complete search history.

(56) References Cited

U.S. PATENT DOCUMENTS

| | | | |
|---|---|---|---|
| 4,458,294 A * | 7/1984 | Womack | ............... H01G 4/2325 338/309 |
| 5,680,092 A | 10/1997 | Yamada et al. | |
| 6,373,683 B1 * | 4/2002 | Higuchi | ................. H01C 1/148 361/305 |
| 2008/0068778 A1 | 3/2008 | Taniguchi et al. | |

(Continued)

FOREIGN PATENT DOCUMENTS

| | | |
|---|---|---|
| CN | 101517573 A | 8/2009 |
| CN | 102222581 A | 10/2011 |

(Continued)

OTHER PUBLICATIONS

PCT/JP2013/053237 Written Opinion dated Mar. 12, 2013.

*Primary Examiner* — Dion R Ferguson
(74) *Attorney, Agent, or Firm* — Arent Fox LLP

(57) ABSTRACT

An electronic part that includes an electronic part main body and an external electrode on the surface of the electronic part main body. The external electrode includes at least one alloy layer selected from among a Cu—Ni alloy layer and a Cu—Mn alloy layer, and a Sn-containing layer on the outer side of the alloy layer. The Sn-containing layer is the outermost layer of the external electrode. The Sn-containing layer is in contact with the alloy layer.

12 Claims, 2 Drawing Sheets

(56) References Cited

U.S. PATENT DOCUMENTS

| | | | |
|---|---|---|---|
| 2008/0118721 A1* | 5/2008 | Horie | H01C 1/148 428/209 |
| 2009/0002920 A1* | 1/2009 | Itamura | H01G 4/2325 361/321.3 |
| 2009/0190285 A1 | 7/2009 | Kusano et al. | |
| 2011/0216472 A1 | 9/2011 | Nakamura et al. | |
| 2011/0310528 A1* | 12/2011 | Chai | H01G 4/005 361/321.1 |
| 2012/0156512 A1 | 6/2012 | Nakano et al. | |
| 2013/0258546 A1* | 10/2013 | Kim | H01G 4/12 361/301.4 |

FOREIGN PATENT DOCUMENTS

| | | |
|---|---|---|
| JP | 8-138902 | 5/1996 |
| JP | 2002-015946 A | 1/2002 |
| JP | 2002-158137 A | 5/2002 |
| JP | 2005-101470 A | 4/2005 |
| JP | 2006-080428 A | 3/2006 |
| JP | 2008-078593 A | 4/2008 |
| JP | 2008-300769 A | 12/2008 |
| JP | 2011-187774 A | 9/2011 |
| KR | 10-0755654 B1 | 9/2007 |
| WO | WO 2005036571 A1 | 4/2005 |
| WO | WO 2011/027659 A1 | 3/2011 |

* cited by examiner

ELECTRONIC PART

CROSS REFERENCE TO RELATED APPLICATIONS

The present application is a continuation of International application No. PCT/JP2013/053237, filed Feb. 12, 2013, which claims priority to Japanese Patent Application No. 2012-048026, filed Mar. 5, 2012, the entire contents of each of which are incorporated herein by reference.

FIELD OF THE INVENTION

The present invention relates to an electronic part, and more particularly to an electronic part including an external electrode that is configured to join, by soldering, the external electrode to a joining object such as a land electrode for mounting.

BACKGROUND OF THE INVENTION

Surface-mounted electronic parts such as a chip capacitor and a chip inductor are usually mounted by soldering an external electrode formed in an electronic part main body, for example, to a land electrode for mounting disposed on a substrate.

As such electronic parts, an electronic part, which has an external electrode provided with a Sn plating layer or the like on the surface thereof for the purpose of improving solder wettability of the external electrode, is widely used.

However, when an electronic part having a plating layer formed on the surface thereof by plating is mounted by soldering, there is a problem that a plating solution or a cleaning solution remaining within the external electrode is exposed to a high temperature at the time of soldering to rapidly vaporize, and causes solder explosion (solder burst), and thereby a short circuit occurs between neighboring electrodes or electronic parts.

Then, in order to produce an electronic part which can solve such a problem, there is proposed, for example, a method for producing a capacitor (laminated ceramic capacitor), in which a conductor paste containing a spherical Cu powder, a flaky Cu powder and a glass powder, in which the amount of the flaky Cu powder is 2 to 33 parts by weight with respect to 100 parts by weight of the total Cu powder, and the amount of the glass powder is 6 to 10 parts by weight with respect to 100 parts by weight of the total Cu powder is applied onto a side surface of a rectangular parallelepiped-shaped laminate formed by alternately laminating a dielectric layer and an internal electrode layer, and fired/baked to form an external electrode electrically conductive to the internal electrode layer, and a plating layer is formed on the surface of the external electrode by a wet-plating method (refer to Patent Document 1).

In the case of a capacitor produced by this method, since a compact external electrode (Cu thick-film electrode) is formed, it is said that water or crystal water of Ni hardly penetrates into the external electrode in forming a Ni-plating layer or a Sn-plating layer by a wet-plating method, and for example, in the case of mounting a capacitor on a component pad electrode on a mother board, even when solder on the component pad electrode rises along a side surface of the capacitor in a reflow step, the amount of water required to be exuded from the inside of the external electrode and come into contact with high-temperature melted solder to cause vapor explosion is insufficient, and therefore solder burst toward the outside is suppressed to enable prevention of a short circuit between neighboring electronic parts (paragraph 0008 of Patent Document 1).

However, since a glass component which is more or less soluble in a plating solution is used in the Cu thick-film electrode, it is difficult to completely prevent the occurrence of solder burst with a method of optimizing (densifying) an external electrode alone.

Further, the plating solution is often intended to be improved, but dissolution of the glass component cannot be completely prevented, and it is actually impossible to completely avoid the occurrence of solder burst.

Further, when an outermost layer of the plating layer formed on the external electrode is a Sn plating layer as with the capacitor described in Examples of Patent Document 1, there is a problem that whiskers, in which crystals of Sn grow out from the surface of the plating layer, are generated, and these whiskers cause a short circuit.

Patent Document 1: Japanese Patent Laid-open Publication No. 2005-101470

SUMMARY OF THE INVENTION

The present invention was made to solve the above-mentioned problems, and it is an object of the present invention to provide an electronic part which does not cause solder burst in mounting the electronic part by soldering and which can be mounted by soldering highly reliably, and further an electronic part which does not generate whiskers in performing mounting by soldering and which has high joint strength at a high temperature.

In order to solve the above-mentioned problems, the electronic part of the present invention is an electronic part including an electronic part main body and an external electrode formed on a surface of the electronic part main body, wherein the external electrode includes:

at least one alloy layer selected from among a Cu—Ni alloy layer and a Cu—Mn alloy layer, and a Sn-containing layer which is formed on an outer side of the alloy layer and contains Sn.

In addition, in the present invention, examples of the external electrode formed on the surface of the electronic part main body include external electrodes of surface-mounted electronic parts such as a chip capacitor and a chip inductor, and surface electrodes formed on the surfaces of multi-layer boards.

Further, in the present invention, another electrode layer such as a Cu thick-film electrode layer may be further disposed on a lower side of the alloy layer.

In the present invention, the Sn-containing layer can be formed as an outermost layer of the external electrode.

In conventional electronic parts, when the outermost layer of the external electrode is a Sn-containing layer, whiskers are easily generated, but even in this case, the generation of the whiskers can be suppressed and prevented with the electronic part of the present invention. The reason for this is that the alloy layer rapidly reacts with the Sn-containing layer by a rapid diffusion action at an interface between the Cu—Ni alloy layer and/or the Cu—Mn alloy layer and the Sn-containing layer to produce an intermetallic compound, and thereby Sn of the outermost layer is expelled.

Further, when the Sn-containing layer is in contact with the alloy layer, it is particularly significant. When the Sn-containing layer is in contact with the alloy layer, the alloy layer more rapidly reacts with the Sn-containing layer to produce and solidify an intermetallic compound having a high melting point (for example, a melting point of 400° C. or more), and therefore rapid generation of water vapor from within the external electrode, that is, the occurrence of solder burst resulting from an increase in internal pressure of the external electrode can be suppressed and prevented efficiently.

Further, the Sn-containing layer is preferably a plating layer.

There may be cases where a Sn plating layer or a plating layer of a Sn-based alloy is formed on the surface of the external electrode of the electronic part in order to improve solder wettability, and the present invention is more significant for such a case.

The alloy layer may be a plating layer, or may be a thick-film electrode.

The alloy layer may be a plating layer formed by plating, or may be a thick-film electrode formed by applying a conductive paste (Cu—Ni paste or Cu—Mn paste) and baking the paste, and the effect of the present invention can be achieved in both cases.

The alloy layer is preferably either one of a Cu—Ni alloy layer containing Ni in a proportion of 5 to 30% by weight and a Cu—Mn alloy layer containing Mn in a proportion of 5 to 30% by weight.

By satisfying the above-mentioned requirements, it becomes possible to realize a rapid diffusion action between a metal material composing the alloy layer of the external electrode and Sn to achieve the effect of the present invention described above.

The alloy layer is more preferably either one of a Cu—Ni alloy layer containing Ni in a proportion of 5 to 20% by weight and a Cu—Mn alloy layer containing Mn in a proportion of 5 to 20% by weight.

By satisfying the above-mentioned requirements, it becomes possible to realize a rapid diffusion action between a metal material composing the alloy layer of the external electrode and Sn to more certainly achieve the effect of the present invention described above.

Further, it is preferred that the electronic part main body is a ceramic laminate including a plurality of ceramic layers and internal electrode layers arranged between the ceramic layers in such a manner that a part of the internal electrodes are led out to end faces, and the external electrodes are arranged at the end faces to which the internal electrode layers are led out so as to be electrically conductive to the internal electrode layers.

In general, a laminated ceramic electronic part has the above-mentioned constitution, and the present invention can be suitably used for such a laminated ceramic electronic part.

Since the electronic part of the present invention is an electronic part including an electronic part main body and an external electrode formed on the surface of the electronic part main body, wherein the external electrode includes at least one alloy layer selected from among a Cu—Ni alloy layer and a Cu—Mn alloy layer, and a Sn-containing layer which is formed on the outer side of the alloy layer and contains Sn, the alloy layer rapidly reacts with the Sn-containing layer by a rapid diffusion action at an interface between the Cu—Ni alloy layer and/or the Cu—Mn alloy layer and the Sn-containing layer to produce and solidify an intermetallic compound having a high melting point (for example, a melting point of 400° C. or more), and therefore rapid generation of water vapor from within the external electrode, that is, the occurrence of solder burst resulting from an increase in internal pressure of the external electrode can be suppressed and prevented efficiently.

In addition, the above-mentioned rapid diffusion between the Cu—Ni alloy and/or the Cu—Mn alloy and Sn occurs since the reaction is repeated while peeling and dispersing the intermetallic compound in Sn melted in a heat treatment step.

Further, since most of Sn in the Sn-containing layer arranged on the outer side of the alloy layer is rapidly expelled by the rapid diffusion, the problem of the generation of whiskers can be efficiently suppressed and prevented, for example, even when the Sn-containing layer located on the outer side of the external electrode lies at the outermost layer.

Further, since most of Sn is rapidly expelled by the rapid diffusion between the Cu—Ni alloy and/or the Cu—Mn alloy and Sn to produce an intermetallic compound having a melting point of 400° C. or more in a joint portion between the electronic part and the joining object (for example, a land electrode for mounting on a substrate), it is possible to form a joint portion (soldered joint portion) having high strength at a high temperature, which does not cause falling off of an electronic part when reflow is carried out multiple times after an electronic part is mounted or when the mounted electronic part (for example, car-mounted electronic part) is used in a high-temperature environment.

In the case where the outermost layer of the external electrode is at least one selected from among the Cu—Ni alloy layer and the Cu—Mn alloy layer, sufficient solder wettability may not be attained due to the oxidation of the alloy layer, but in the present invention, deterioration of the solder wettability by the oxidation of the alloy layer can be prevented to ensure a good soldering property because the Sn-containing layer is disposed on the outer side of the alloy layer.

In addition, in order to achieve the effect of the present invention more reliably, it is preferred that a relationship between the thickness of the Cu—Ni alloy layer and/or the Cu—Mn alloy layer and the thickness of an antioxidant film (Sn-containing film) is adjusted in such a manner that the thickness of the Sn-containing film is 2 to 3 μm with respect to 10 μm of the alloy layer.

DETAILED DESCRIPTION OF THE INVENTION

Embodiments of the present invention will be shown below, and characteristics of the present invention will be described in more detail.

Figure 1:
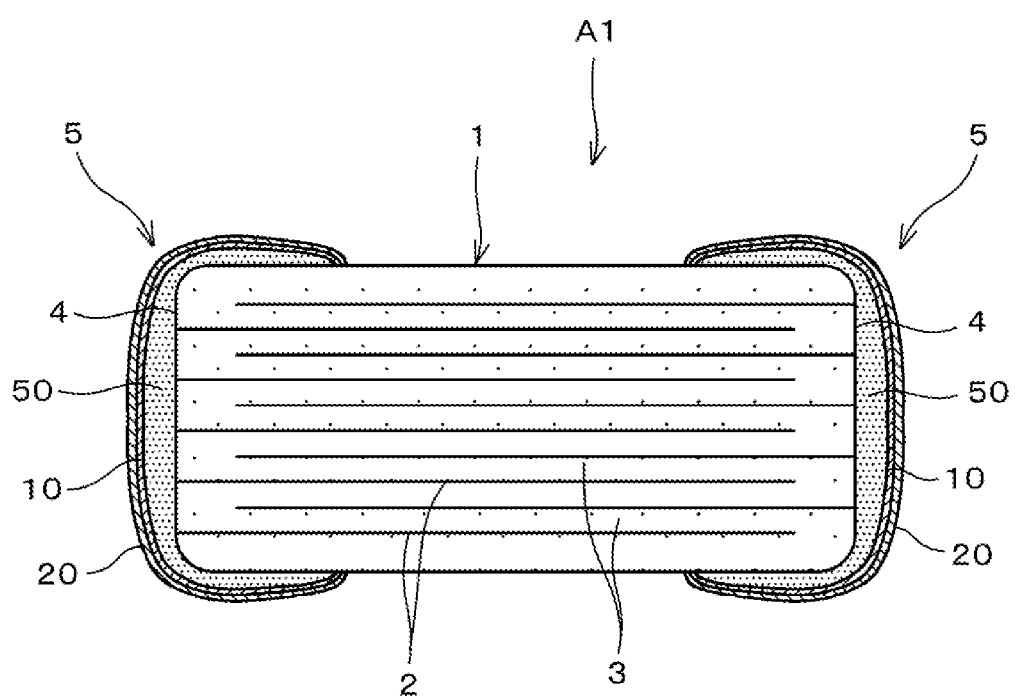
FIG. 1 is a sectional view schematically showing a constitution of an electronic part (laminated ceramic capacitor) A1 of Embodiment 1 of the present invention.
Figure 2:
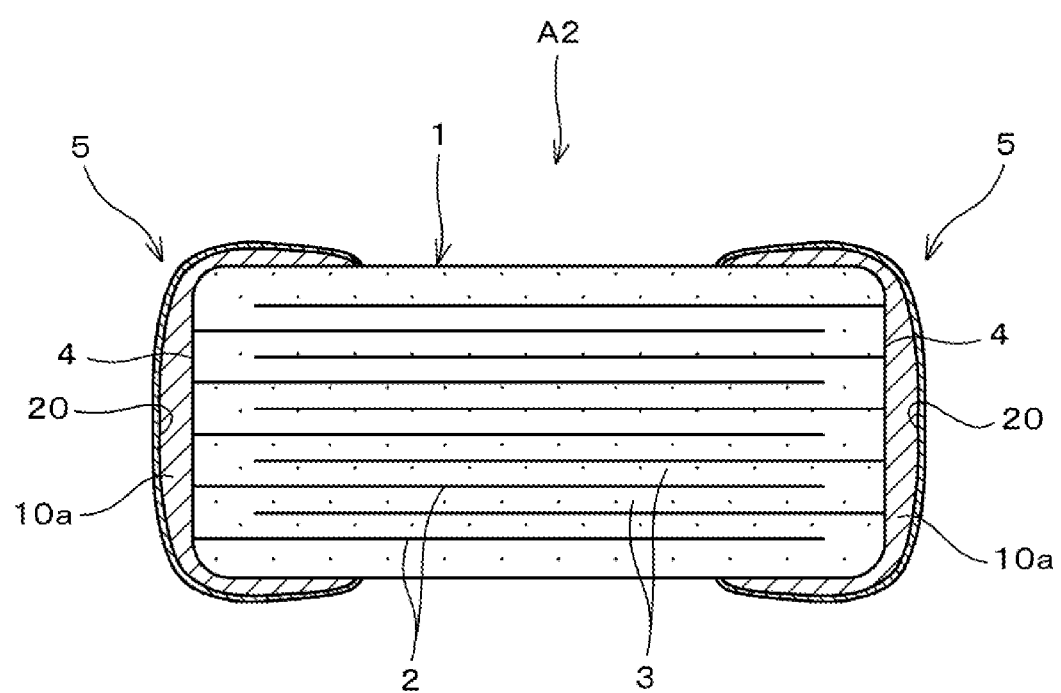
FIG. 2 is a sectional view schematically showing a constitution of an electronic part (laminated ceramic capacitor) A2 of Embodiment 2 of the present invention.

Herein, a laminated ceramic capacitor (Embodiment 1) A1 having a structure as shown in FIG. 1, and a laminated ceramic capacitor (Embodiment 2) A2 having a structure as shown in FIG. 2 were prepared as the electronic parts of the embodiments of the present invention.

An electronic part (laminated ceramic capacitor) A1 of Embodiment 1 shown in FIG. 1 is formed by arranging a pair of external electrodes 5, 5, so as to be electrically conductive to internal electrodes 2, at both end faces 4, 4 of a ceramic laminate (laminated ceramic device) 1 of an electronic part main body having a structure in which the internal electrodes 2 are laminated with ceramic layers (dielectric ceramic layers) 3 as dielectric layers interposed therebetween, and alternately pulled out to both the end faces 4, 4 of the ceramic laminate.

The external electrode 5 includes a Cu thick-film electrode layer 50, a Cu—Ni alloy layer or a Cu—Mn alloy layer (hereinafter, also referred to as simply an "alloy layer") 10 formed thereon by plating, and a Sn plating layer (the Sn-containing layer in the present invention) 20 formed by plating on the alloy layer 10.

As with the electronic part (laminated ceramic capacitor) A1 shown in FIG. 1, an electronic part (laminated ceramic capacitor) A2 of Embodiment 2 shown in FIG. 2 is also formed by arranging a pair of external electrodes 5, 5 so as to be electrically conductive to internal electrodes 2, at both end faces 4, 4 of a ceramic laminate (laminated ceramic device) 1 of an electronic part main body having a structure in which the internal electrodes 2 are laminated with ceramic layers (dielectric ceramic layers) 3 as dielectric layers interposed therebetween, and alternately pulled out to both the end faces 4, 4 of the ceramic laminate.

However, in the electronic part A2 in FIG. 2, the external electrodes 5, 5 include Cu—Ni alloy layers (thick-film Cu—Ni alloy layers) or Cu—Mn alloy layers (thick-film Cu—Mn alloy layers) 10a formed at both the end faces 4, 4 of the ceramic laminate (laminated ceramic device) 1, and Sn plating layers (the Sn-containing layer in the present invention) 20 formed by plating on the thick-film Cu—Ni alloy layers or the thick-film Cu—Mn alloy layers 10a.

Production of Electronic Part (Laminated Ceramic Capacitor) A1 of Embodiment 1

Hereinafter, a method for producing the electronic part (laminated ceramic capacitor) A1 of Embodiment 1 (refer to FIG. 1) will be described.

First, a ceramic green sheet predominantly composed of barium titanate was prepared. Then, a conductive paste (paste for an internal electrode) containing a Ni powder as a conductive component was applied to the surface of the ceramic green sheet by screen printing to form an internal electrode paste pattern.

Then, a plurality of the ceramic green sheets having the internal electrode paste pattern formed thereon were laminated and press-bonded to form a laminate.

Next, the laminate was cut along a direction of lamination, that is, a direction of thickness to obtain chip laminates (unfired laminates serving as ceramic laminates 1 (FIG. 1) after firing) in which the internal electrode paste pattern was alternately exposed to one side and the other side of the end faces (cut end faces) opposed to each other.

Then, each of the unfired laminates was fired at 1300° C. for 1 hour in the air to obtain a ceramic laminate 1 (FIG. 1). Dimensions of the ceramic laminate 1 were 0.8 mm in width (W), 1.6 mm in length (L), and 0.8 mm in thickness (W).

Then, a fired type Cu paste (Cu thick-film paste containing a Cu powder as a conductive component) was applied to both end faces of the ceramic laminate 1 and fired to form a Cu thick-film electrode 50 being an external electrode main body.

Subsequently, electrolytic plating was performed by using a Cu—Ni alloy plating solution on the Cu thick-film electrode 50 formed at both end faces of the ceramic laminate 1 to form a Cu—Ni alloy layer (plating layer) or a Cu—Mn alloy layer (plating layer) 10.

At this time, Cu—Ni alloy layers or Cu—Mn alloy layers which have alloy compositions of the sample Nos. 1 to 14 in Table 1 were formed by varying the ratio of the Cu metal salt to the Ni metal salt in the plating solution.

In addition, for example, the numeral 5 in "Cu-5Ni" in the column of Composition of Alloy Layer of the sample No. 1 in Table 1 indicates the value of weight percentage of an appropriate component (Ni in this case). That is, in this case, the numeral represents that the proportion of Ni in the Cu—Ni alloy powder is 5% by weight. The proportion of Ni and the proportion of Mn of other samples are denoted in the same manner.

The thickness of the Cu—Ni alloy layers (plating layers) or the Cu—Mn alloy layers (plating layers) shown in the sample Nos. 1 to 14 in Table 1 was adjusted by varying the time of the plating treatment.

Thereafter, electronic parts (laminated ceramic capacitors) A1 (refer to FIG. 1) of the sample Nos. 1 to 14 in Table 1 according to Embodiment 1 of the present invention were prepared by forming a Sn plating layer (Sn-containing layer) 20 having a thickness of 2 μm, by continued use of a Sn plating solution, on the Cu—Ni alloy layer or the Cu—Mn alloy layer formed in the above step (6).

Further, for comparison, a sample of the sample No. 15 in Table 1 (the sample of Comparative Example 1 corresponding to the electronic part A1 in Embodiment 1), which had the same structure as in the samples of the sample Nos. 1 to 14 except that it had a Ni layer (Ni plating layer) having a thickness of 10 μm in place of the Cu—Ni alloy layer or Cu—Mn alloy layer, was prepared.

Production of Electronic Part (Laminated Ceramic Capacitor) A2 of Embodiment 2

Next, a method for producing the electronic part (laminated ceramic capacitor) A2 of Embodiment 2 (refer to FIG. 2) will be described.

First, a ceramic green sheet predominantly composed of barium titanate was prepared. Then, a conductive paste (paste for an internal electrode) containing a Ni powder as a conductive component was applied to the surface of the ceramic green sheet by screen printing to form an internal electrode paste pattern.

Then, a plurality of the ceramic green sheets having the internal electrode paste pattern formed thereon were laminated and press-bonded to form a laminate.

Next, the laminate was cut along a direction of lamination, that is, a direction of thickness to obtain chip laminates (unfired laminates serving as ceramic laminates 1 (FIG. 2) after firing) in which the internal electrode paste pattern was alternately exposed to one side and the other side of the end faces (cut end faces) opposed to each other.

Then, each of the unfired laminates was fired at 1300° C. for 1 hour in the air to obtain a ceramic laminate 1 (FIG. 2). Dimensions of the ceramic laminate 1 were 0.8 mm in width (W), 1.6 mm in length (L), and 0.8 mm in thickness (W).

Then, a fired type Cu—Ni thick-film paste or Cu—Mn thick-film paste as a conductive paste for forming an external electrode was applied to both end faces 4, 4 of the ceramic laminate 1.

As the Cu—Ni thick-film paste, a paste-like material, which was prepared by mixing a Cu—Ni powder having a particle size of 3 μm, glass frits, an organic binder, a dispersant and an organic solvent, and dispersing/kneading the resulting mixture with a ball mill and a roll mill, was used.

As the Cu—Mn thick-film paste, a paste-like material, which was prepared by similarly mixing a Cu—Mn powder having a particle size of 3 μm, glass frits, an organic binder, a dispersant and an organic solvent, and dispersing/kneading the resulting mixture with a ball mill and a roll mill, was used.

The proportion of Ni in the Cu—Ni alloy powder composing the Cu—Ni thick-film paste, and the proportion of Mn in the Cu—Mn alloy powder composing the Cu—Mn thick-film paste were varied within the range of proportions shown in the sample Nos. 21 to 30 in Table 2.

Then, a thick-film Cu—Ni alloy layer or a thick-film Cu—Mn alloy layer 10a (FIG. 2) was formed by firing the ceramic laminate 1 having the Cu—Ni thick-film paste or the Cu—Mn thick-film paste which was prepared in the way described above and applied to both end faces 4, 4.

In addition, it was verified by the cross-section observation that the thickness of the fired alloy layer 10a was 100 to 150 μm.

Thereafter, electronic parts (laminated ceramic capacitors) A2 (refer to FIG. 2) of the sample Nos. 21 to 30 in Table 2 according to Embodiment 2 of the present invention were prepared by forming a Sn plating layer (Sn-containing layer) 20 having a thickness of 2 μm by using a Sn plating solution on the thick-film Cu—Ni alloy layer or the thick-film Cu—Mn alloy layer 10a formed in the above step.

Further, for comparison, a sample of the sample No. 31 in Table 2 (the sample of Comparative Example 2 corresponding to the electronic part A2 in Embodiment 2), which had the same structure as in the samples of the sample Nos. 21 to 30 except that it had a Cu thick-film layer having a thickness of 100 to 150 μm in place of the thick-film Cu—Ni alloy layer or thick-film Cu—Mn alloy layer, was prepared.

Then, the samples of the sample Nos. 1 to 14 in Table 1 (samples of Embodiment 1 of the present invention) and the sample of Comparative Example 1 of the sample No. 15, and the samples of the sample Nos. 21 to 30 in Table 2 (samples of Embodiment 2 of the present invention) and the sample of Comparative Example 2 of the sample No. 31, which were respectively prepared in the way described above, were subjected to the following evaluation of characteristics.

[Evaluation of Characteristics]

In evaluating characteristics, a substrate (copper-clad FR4 glass-epoxy substrate for a laminated ceramic electronic part) provided with a Cu electrode (joining object) was prepared as a substrate for mounting by soldering an electronic part (laminated ceramic capacitor) being a sample prepared in the way described above. Then, a Sn-3Ag-0.5Cu solder paste (old Military Specification RA flux) manufactured by SENJU METAL INDUSTRY CO., LTD. was printed on the surface of the Cu electrode by using a metal mask. The thickness of the metal mask was 50 μm.

In addition, in the expressions of the above-mentioned material (solder paste), for example, the numeral 3 of "Sn-3Ag-0.5Cu" indicates the value of weight % of the relevant component (Ag in this case), and the numeral 0.5 indicates the value of weight % of Cu.

Thereafter, each electronic part (laminated ceramic capacitor) being a sample prepared in the way described above was mounted on the printed solder paste, and then the external electrode of the electronic part was joined to the Cu electrode of the glass-epoxy substrate in the conditions of 150° C. in preheating and 250° C. in main heating by using a reflow apparatus to electrically and mechanically connect the external electrode to the Cu electrode.

Joint structures obtained in the way described above were used as samples for characteristic evaluation, and their characteristics were evaluated by the following methods.

<<Evaluation of Solder Burst>>

Each of the samples for characteristic evaluation prepared in the way described above was observed at a magnification of 10 times by using a stereomicroscope, the presence or absence of splattered solder grains was checked, and the sample for which splattering was found was rated as defective (x), and the sample for which splattering was not found was rated as good (○).

<<Evaluation of Whiskers>>

Each of the samples for characteristic evaluation was left standing for 60 days in a constant-temperature oven at 50° C., and the central area of the plating layer excluding the peripheral area within 5 mm from the end of the plating layer was observed by a SEM at a magnification of 1000 times, the presence or absence of whiskers was checked, and the sample in which the whiskers were found was rated as defective (x), and the sample in which the whiskers were not found was rated as good (○).

<<Evaluation of Strength at High Temperature>>

A sample for characteristic evaluation, in which a surface of a substrate joined to an electronic part (laminated ceramic capacitor) faces downward, was placed in a hot air forced circulation oven at 250° C. for 5 minutes, and then taken out, and the joint strength at a high temperature (strength at a high temperature) was evaluated by checking the presence or absence of falling off of the electronic part from the substrate.

At this time, the sample in which falling off of the electronic part was found was rated as defective (x). Moreover, in order to check a state of joining between the external electrode of the electronic part and the Cu electrode of the substrate through an intermetallic compound, an unreacted metal Sn component was etched, and then the presence or absence of falling off of the electronic part was investigated.

At this time, the sample in which falling off of the electronic part was found was rated as good (○) since joining was tentatively achieved, and the sample in which falling off of the electronic part was not found even after etching was rated as excellent (⊙) considering that the electronic part is firmly joined through the intermetallic compound.

The results of characteristics evaluation are shown together in Tables 1 and 2.

TABLE 1

| Sample No. | Composition of Alloy Layer [% by weight] | Thickness of Alloy Layer [μm] | Evaluation of Solder Burst | Evaluation of Whiskers | Evaluation of Strength at High Temperature |
|---|---|---|---|---|---|
| 1 | Cu—5Ni | 10 | ○ | ○ | ⊙ |
| 2 | Cu—10Ni | 10 | ○ | ○ | ⊙ |
| 3 | Cu—15Ni | 10 | ○ | ○ | ⊙ |
| 4 | Cu—20Ni | 10 | ○ | ○ | ⊙ |
| 5 | Cu—30Ni | 10 | ○ | ○ | ○ |
| 6 | Cu—5Mn | 10 | ○ | ○ | ⊙ |
| 7 | Cu—10Mn | 10 | ○ | ○ | ⊙ |
| 8 | Cu—15Mn | 10 | ○ | ○ | ⊙ |
| 9 | Cu—20Mn | 10 | ○ | ○ | ⊙ |
| 10 | Cu—30Mn | 10 | ○ | ○ | ○ |
| 11 | Cu—10Ni | 2 | ○ | ○ | ○ |
| 12 | Cu—10Ni | 5 | ○ | ○ | ○ |
| 13 | Cu—10Ni | 20 | ○ | ○ | ⊙ |
| 14 | Cu—10Ni | 50 | ○ | ○ | ⊙ |
| 15 (Comparative Example 1) | Ni | 10 | X | X | X |

TABLE 2

| Sample No. | Composition of Alloy Layer [% by weight] | Evaluation of Solder Burst | Evaluation of Whiskers | Evaluation of Strength at High Temperature |
|---|---|---|---|---|
| 21 | Cu—5Ni | ○ | ○ | ⊙ |
| 22 | Cu—10Ni | ○ | ○ | ⊙ |
| 23 | Cu—15Ni | ○ | ○ | ⊙ |

TABLE 2-continued

| Sample No. | Composition of Alloy Layer [% by weight] | Evaluation of Solder Burst | Evaluation of Whiskers | Evaluation of Strength at High Temperature |
|---|---|---|---|---|
| 24 | Cu—20Ni | ○ | ○ | ⊙ |
| 25 | Cu—30Ni | ○ | ○ | ○ |
| 26 | Cu—5Mn | ○ | ○ | ⊙ |
| 27 | Cu—10Mn | ○ | ○ | ⊙ |
| 28 | Cu—15Mn | ○ | ○ | ⊙ |
| 29 | Cu—20Mn | ○ | ○ | ⊙ |
| 30 | Cu—30Mn | ○ | ○ | ○ |
| 31 (Comparative Example 2) | Cu | X | X | X |

In both cases of (1) the samples of the sample Nos. 1 to 14 in Table 1 (electronic parts A1 of Embodiment 1 of the present invention) having a structure shown in FIG. 1 and (2) the samples of the sample Nos. 21 to 30 in Table 2 (electronic parts A2 of Embodiment 2 of the present invention) having a structure shown in FIG. 1, no occurrence of solder burst was found, and it was confirmed that the electronic parts had practical solder burst resistance.

The reason for this is probably that an intermetallic compound layer having a high melting point was rapidly formed by the rapid diffusion action at an interface between the Cu—Ni alloy layer or the Cu—Mn alloy layer and the Sn plating layer and solidified, and thereby solder burst resistance was improved.

In addition, in the case of the sample of the sample No. 15 in Table 1 (the sample of Comparative Example 1 corresponding to the electronic part A1 in Embodiment 1) including a plated Ni layer in place of the plated alloy layer (Cu—Ni alloy layer or Cu—Mn alloy layer), the occurrence of solder burst was found. The reason for this is that the solder burst resistance was insufficient since the rapid diffusion action did not occur at an interface between the plated Ni layer and the Sn layer.

Also in the case of the sample of the sample No. 31 in Table 2 (the sample of Comparative Example 2 corresponding to the electronic part A2 in Embodiment 2) including a thick-film Cu layer in place of the thick-film alloy layer, the solder burst resistance was insufficient and the occurrence of solder burst was found. The reason for this is that the solder burst resistance was insufficient since the rapid diffusion action did not occur at an interface between the thick-film Cu layer and the Sn layer.

Also in the evaluation of whiskers, in the samples of the sample Nos. 1 to 14 in Table 1 (electronic parts A1 of Embodiment 1 of the present invention) and the samples of the sample Nos. 21 to 30 in Table 2 (electronic parts A2 of Embodiment 2 of the present invention), no generation of the whiskers was found.

The reason for this is that in the case of the samples of the sample Nos. 1 to 14 in Table 1 and the samples of the sample Nos. 21 to 30 in Table 2, Sn was rapidly diffused into the Cu—Ni alloy layer or the Cu—Mn alloy layer in a soldering step to become an intermetallic compound, and therefore the metal Sn slightly remained.

Although not shown in Table 1, such behavior that generation of the whiskers is apprehended was found when the thickness of the plated alloy layer was 0.5 µm or less. It is found from this behavior that it is desirable to set the thickness of the plated alloy layer (Cu—Ni plated alloy layer or Cu—Mn plated alloy layer) to a thickness more than 0.5 µm in the condition of Embodiment 1.

However, the thickness of the plated alloy layer alone does not particularly pose a problem since a relationship between the metal amount (alloy amount) (i.e., the amount of the Cu—Ni alloy or the Cu—Mn alloy) contained in the plated alloy and the Sn amount contained in the Sn-containing layer is also pertinent to the rapid diffusion action at an interface.

Also in the evaluation of strength at a high temperature, in both cases of the samples of the sample Nos. 1 to 14 in Table 1 (electronic parts A1 of Embodiment 1 of the present invention) and the samples of the sample Nos. 21 to 30 in Table 2 (electronic parts A2 of Embodiment 2 of the present invention), good results, that is, the results rated as good (○) or excellent (⊙) were achieved.

The reason for this is probably that an intermetallic compound layer having a high melting point is rapidly formed by the rapid diffusion action at an interface between the Cu—Ni alloy layer or the Cu—Mn alloy layer and the Sn plating layer and solidified, and thereby the joint strength at a high temperature is improved.

However, although not shown in Table 1, there was a tendency that the strength at a high temperature was deteriorated when the thickness of the plated alloy layer was 1 µm or less. It is found from this tendency that it is desirable to set the thickness of the plated alloy layer (Cu—Ni plated alloy layer or Cu—Mn plated alloy layer) to a thickness more than 1 µm in the condition of Embodiment 1.

In addition, it is found that when the thickness of the plated alloy layer (Cu—Ni plated alloy layer or Cu—Mn plated alloy layer) is 10 µm or more, the evaluation of the strength at a high temperature is excellent (⊙) and the case is particularly preferred.

However, as described above, the thickness of the plated alloy layer alone does not particularly pose a problem since a relationship between the metal amount (alloy amount) (i.e., the amount of the Cu—Ni alloy or the Cu—Mn alloy) contained in the plated alloy and the Sn amount contained in the Sn-containing layer is also pertinent to the rapid diffusion action at an interface.

Further, in view of the samples of the sample Nos. 1 to 10 in Table 1, in which the thickness of the alloy layer is 10 µm, the samples of the sample No. 5 (the sample in which the proportion of Ni in the Cu—Ni alloy is 30% by weight) and the sample No. 10 (the sample in which the proportion of Mn in the Cu—Mn alloy is 30% by weight) had a strength at a high temperature rated as good (○), whereas the samples of the sample Nos. 1 to 4 and 6 to 9 had a strength at a high temperature rated as excellent (⊙), and it is found from these results that the proportion of Ni or Mn in the Cu—Ni alloy or the Cu—Mn alloy is more preferably in the range of 5 to 20% by weight.

The reason for this is attributed to the fact that when the proportion of Ni or Mn is in the range of 5 to 20% by weight, the rapid diffusion action occurs more rapidly to facilitate the production of an intermetallic compound, and thereby, the amount of Sn which causes deterioration of the strength at a high temperature is reduced.

Further, in the electronic part (laminated ceramic capacitor) A1 in Embodiment 1 described above, the electronic part has a configuration including an external electrode having a structure in which the Cu—Ni alloy layer or the Cu—Mn alloy layer (plated alloy layer) formed by plating is disposed on the Cu thick-film electrode being an external electrode main body, and the Sn plating layer is further formed thereon, and in the electronic part (laminated ceramic capacitor) A2 in Embodiment 2, the electronic part has a configuration including an external electrode having a structure in which the Sn plating layer is formed on the Cu—Ni alloy layer or the Cu—Mn alloy layer (thick-film alloy layer) formed, as an external electrode main body, by applying and baking an electrode paste, whereas in the present invention, since the external electrode has only to include the Sn-containing layer on the outer side of the alloy layer in order to prevent the solder burst from being generated, it is possible to employ, for example, (a) a constitution in which a layer of a different metal or different alloy (e.g., a plating layer of a noble metal such as Au or Ag—Pd) is further arranged on the outer side of the Sn-containing layer such as a Sn plating layer, or (b) a constitution in which a layer of a different metal or different alloy (e.g., a plating layer of a noble metal such as Au or Ag—Pd) is arranged between the alloy layer and the Sn-containing layer, and a similar effect can be achieved also in these cases.

Further, in the embodiments described above, the case in which the electronic part is a laminated ceramic capacitor, and the external electrodes are electrodes formed at end faces of the ceramic laminate (laminated ceramic device) has been described as an example, but the electronic part may be a printed board or a multi-layer board, and the external electrode may be a surface electrode (electrode for mounting) formed on the surface of the electronic part, and there is no particular restriction on the kind of the electronic part and the form of the external electrode in the present invention.

The present invention is not intended to be limited to the above-mentioned embodiments in other points, and various applications and variations may be made within the scope of the invention.

DESCRIPTION OF REFERENCE SYMBOLS

A1 Electronic part (laminated ceramic capacitor) of Embodiment 1
A2 Electronic part (laminated ceramic capacitor) of Embodiment 2
1 Ceramic laminate (laminated ceramic device)
2 Internal electrode
3 Ceramic layer (dielectric ceramic layer)
4 End face of ceramic laminate
5 External electrode
10 Cu—Ni alloy layer or Cu—Mn alloy layer (plated alloy layer)
10a Cu—Ni alloy layer or Cu—Mn alloy layer (thick-film alloy layer)
20 Sn plating layer (Sn-containing layer)
50 Cu thick-film electrode layer

The invention claimed is:

1. An electronic part comprising:
an electronic part main body; and
an external electrode on a surface of the electronic part main body, wherein the external electrode comprises:
at least one alloy layer selected from a Cu—Ni alloy layer and a Cu—Mn alloy layer, and
a Sn-containing layer in direct contact with the alloy layer on a side thereof distal from the surface of the electronic part main body.

2. The electronic part according to claim 1, wherein the Sn-containing layer is an outermost layer of the external electrode.

3. The electronic part according to claim 1, wherein the Sn-containing layer is a plating layer.

4. The electronic part according to claim 1, wherein the alloy layer is a plating layer.

5. The electronic part according to claim 1, wherein the alloy layer has a thickness of 100-150 μm.

6. The electronic part according to claim 1, wherein the alloy layer has a thickness of 1-50 μm.

7. The electronic part according to claim 1, wherein the Sn-containing layer has a thickness of 2-3 μm.

8. The electronic part according to claim 1, wherein the alloy layer is a Cu—Ni alloy layer containing Ni in a proportion of 5 to 30% by weight.

9. The electronic part according to claim 1, wherein the alloy layer is a Cu—Mn alloy layer containing Mn in a proportion of 5 to 30% by weight.

10. The electronic part according to claim 1, wherein the alloy layer is a Cu—Ni alloy layer containing Ni in a proportion of 5 to 20% by weight.

11. The electronic part according to claim 1, wherein the alloy layer is a Cu—Mn alloy layer containing Mn in a proportion of 5 to 20% by weight.

12. The electronic part according to claim 1, wherein
the electronic part main body is a ceramic laminate including a plurality of ceramic layers and internal electrode layers arranged between the ceramic layers in such a manner that opposed sets of the internal electrodes are led out to respective opposed end faces of the electronic part main body, and
the external electrodes are arranged at the respective opposed end faces to which the opposed sets of the internal electrode layers are led out and respectively electrically conductive to the opposed sets of the internal electrode layers.

* * * * *